US009951498B2

(12) United States Patent
Ge

(10) Patent No.: US 9,951,498 B2
(45) Date of Patent: Apr. 24, 2018

(54) REGENERATIVE MACHINE COUPLING SYSTEM

(71) Applicant: Caterpillar Inc., Peoria, IL (US)

(72) Inventor: Xinyu Ge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 283 days.

(21) Appl. No.: 15/005,004

(22) Filed: Jan. 25, 2016

(65) Prior Publication Data

US 2016/0138246 A1 May 19, 2016

(51) Int. Cl.

| | |
|---|---|
| ***F16D 31/02*** | (2006.01) |
| ***E02F 9/22*** | (2006.01) |
| ***E02F 3/64*** | (2006.01) |
| ***E02F 3/65*** | (2006.01) |
| ***E02F 9/20*** | (2006.01) |
| *F15B 1/02* | (2006.01) |
| *F15B 3/00* | (2006.01) |

(52) U.S. Cl.

CPC .......... *E02F 9/2217* (2013.01); *E02F 3/6409* (2013.01); *E02F 3/6454* (2013.01); *E02F 3/651* (2013.01); *E02F 9/2054* (2013.01); *F15B 1/02* (2013.01); *F15B 3/00* (2013.01)

(58) Field of Classification Search

CPC .. F15B 1/02; F15B 1/024; F15B 21/14; E02F 3/6454; E02F 9/2217

See application file for complete search history.

(56) References Cited

U.S. PATENT DOCUMENTS

| | | | |
|---|---|---|---|
| 3,937,128 | A | 2/1976 | Hicks et al. |
| 4,088,341 | A | 5/1978 | Hawk |
| 4,266,798 | A | 5/1981 | Smith |
| 4,552,238 | A | 11/1985 | Joyce, Jr. |
| 7,937,858 | B2 | 5/2011 | Roley |
| 8,170,756 | B2 | 5/2012 | Morey et al. |
| 8,636,120 | B1 | 1/2014 | Rogers et al. |

*Primary Examiner* — Michael Leslie

(57) ABSTRACT

A system includes a first machine having a first bail member and a first push bar, at first end. The first bail member includes a first hydraulic cylinder. A first hook and second push bar, at second end. The second push bar includes a second hydraulic cylinder in fluid communication with first hydraulic accumulator. The second machine having second bail member and first push bar, at first end. The second bail member includes third hydraulic cylinder in fluid communication with second hydraulic accumulator. A second hook and second push bar, at second end. The second push bar includes fourth hydraulic cylinder. The first hook coupled to second bail member and second push bar of first machine is in mechanical contact with first push bar of second machine. The impact energy generated at beginning of push operation and pull operation is stored in first hydraulic accumulator and second hydraulic accumulator respectively.

1 Claim, 6 Drawing Sheets

REGENERATIVE MACHINE COUPLING SYSTEM

TECHNICAL FIELD

The present disclosure relates to a system for operation of two or more machines, and more specifically, to a system for recovering energy generated during a collaboration of the two or more machines.

BACKGROUND

Earth moving machines such as track type tractor, wheeled scraper etc. are employed in various industries, such as agriculture, construction, and mining. These machines are utilized for a variety of tasks such as for excavating, hauling, pushing material, and dumping excavated material, and are affected by working conditions of a work site. For example, when the machines are utilized for pushing materials such as heavy rocks then it may take long time for a machine to push materials, thus, leading to a decrease in productivity and/or efficiency of tasks.

In order to increase the productivity and/or the efficiency of the tasks, typically, another machine is used in collaboration with a first machine. For example, in a case, when the first machine is facing difficulty in pushing the materials such as heavy rocks, another machine is utilized which may either push the first machine by engaging at the rear of the first machine, or may pull the first machine by engaging at the front of the first machine. In order to fulfill the collaboration between two machines or among multiple machines, the coupling assembly (e.g. hitch, hook, bail or pushing pad) are installed on the earth moving machines. However, the contact between two machines, during collaboration, is difficult to control. The uncontrolled contact increases fatigue in machine components and decreases useful life of machines. Moreover, the unpredictable load condition during a loading process can also result in sudden uncontrolled contact between the machines working in collaboration. Currently, such uncontrolled contacts between the machines are controlled by various techniques such as by careful maneuvering of the two machines, or by the coupling assembly. But, such techniques do not eliminate the uncontrolled contacts between the machines which results in large impact force and affect the machine productivity. Therefore, the current techniques fail to control the impact force. Also, the impact energy, arising out of uncontrolled contacts, is wasted and results in fatigue of the machine components, and decreases the useful life of machines.

U.S. Pat. No. 8,170,756, hereinafter referred to as '756 reference, discloses an excavating system utilizing a machine-to-machine communication system for a fleet of machines, including at least two machines to effect controlled contact between at least a first machine and a second machine. The controlled contact is achieved by decreasing either the speed of the first machine or the speed of the second machine, and thus affects machine productivity. Moreover, the '756 reference discloses that high relative speed between two machines during push-pull operations leads to uncontrolled contact which results in large impact force. However, the '756 reference fails to disclose recovery of the impact energy during the push-pull operations. Therefore, there is a need for a system to control the impact force, and to recover the impact energy.

SUMMARY OF THE DISCLOSURE

In one aspect of the present disclosure, a system for recovering impact energy generated during at least one of a push operation and a pull operation between two or more machines operated in a worksite is provided. The system includes a first machine and a second machine. The first machine having a first bail member and a first push bar at a first end of the first machine. The first bail member includes a first hydraulic cylinder. The first machine having a first hook and a second push bar at a second end of the first machine. The second push bar includes a second hydraulic cylinder. The second hydraulic cylinder being in fluid communication with a first hydraulic accumulator. The second machine having a second bail member and a first push bar at a first end of the second machine. The second bail member includes a third hydraulic cylinder. The third hydraulic cylinder being in fluid communication with a second hydraulic accumulator. The second machine having a second hook and a second push bar at a second end of the second machine. The second push bar includes a fourth hydraulic cylinder. The first machine and the second machine are adapted to work in collaboration, such that the first hook of the first machine coupled to the second bail member of the second machine, and the second push bar of the first machine being in mechanical contact with the first push bar of the second machine. The impact energy generated at a beginning of the push operation by the second machine may be captured by a regenerative coupling system, and stored in the first hydraulic accumulator. The impact energy generated at a beginning of the pull operation by the first machine may be captured by a regenerative coupling system, and stored in the second hydraulic accumulator.

Other features and aspects of this disclosure will be apparent from the following description and the accompanying drawings.

DETAILED DESCRIPTION

Figure 1:
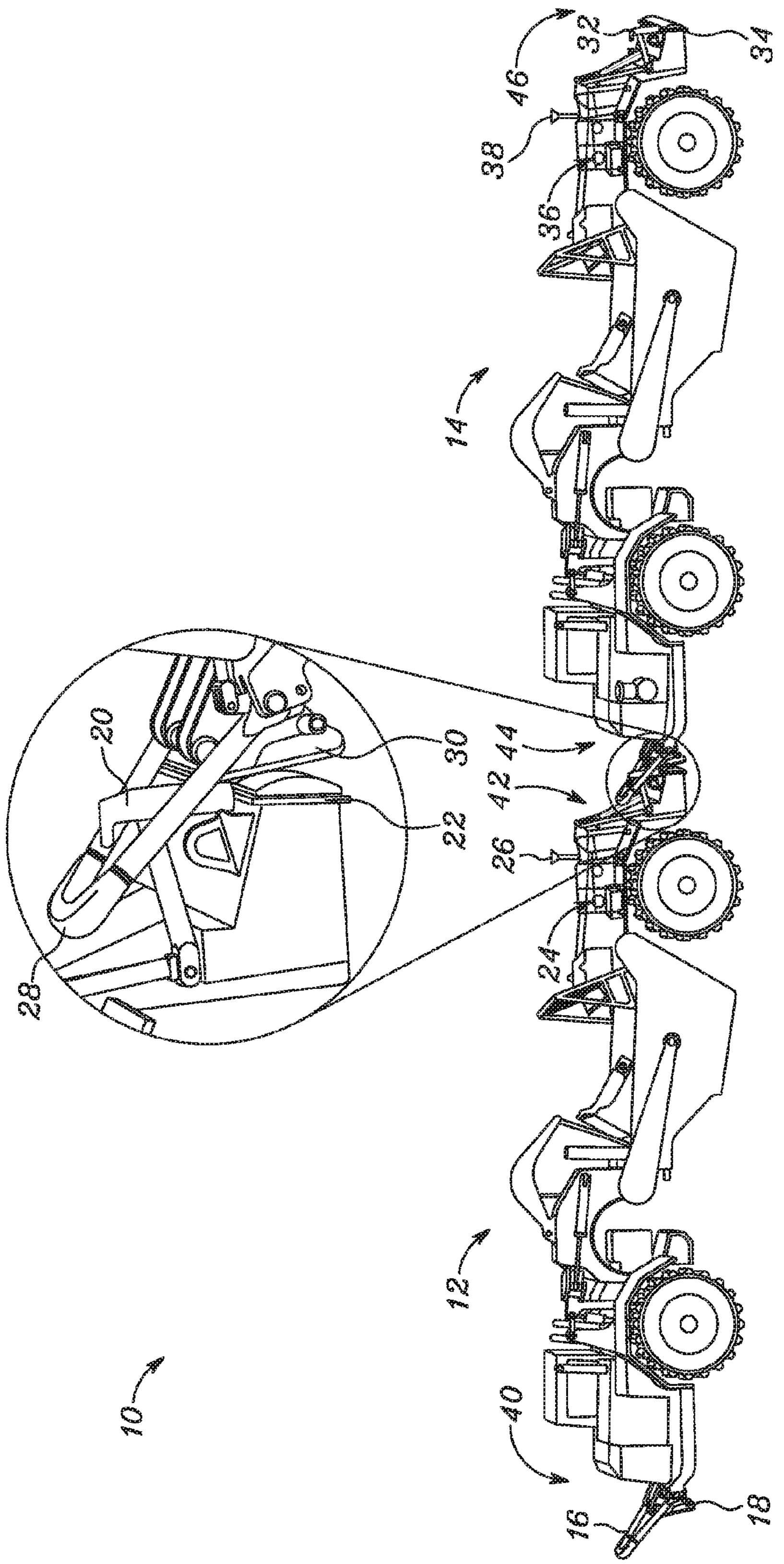
FIG. 1 is a system diagram illustrating two machines collaborating with each other, in accordance with the concepts of the present disclosure.

FIG. 1 is a system diagram illustrating two machines 10 collaborating with each other, in accordance with the concepts of the present disclosure. The machines 10 include a first machine 12, and a second machine 14. The first machine 12 includes a first bail member 16, a first push bar 18 (i.e. a front push bar), a first hook 20, a second push bar 22 (i.e., a rear push bar), a first hydraulic accumulator 24, and a first machine-to-machine communication system 26. Similarly, the second machine 14 includes a second bail member 28, a first push bar 30 (i.e., a front push bar), a second hook 32, a second push bar 34 (i.e., a rear push bar), a second hydraulic accumulator 36, and a second machine-to-machine communication system 38. The first machine 12 having the first bail member 16 and the first push bar 18 at a first end 40 of the first machine 12, and the first hook 20 and the second push bar 22 (i.e., the rear push bar) at a second end 42 of the first machine 12. Similarly, the second machine 14 having the second bail member 28 and the first push bar 30 at a first end 44 of the first machine 12, and the second hook 32 and the second push bar 34 at a second end 46 of the second machine 14. The machines 10 (i.e., the first machine 12, and the second machine 14) may include various other components such as an actuator, a valve, a hydraulic fluid tank, a controller, a display device, and so on. For the purpose of simplicity, the various other components of the machines 10 are not labeled in FIG. 1. Examples of the machines 10 include, but not limited to, a track-type tractor, and a wheeled scraper.

The machines 10 are utilized for a variety of tasks such as for excavating, hauling, scraping, pushing materials, etc. In order to perform such tasks, the machines 10 may need to work in collaboration, i.e. along with each other, in order to help each other. In order to work in collaboration, the machines 10 establish a communication with each other, for example, the first machine 12 and the second machine 14 communicate with each other through the first machine-to-machine communication system 26 of the first machine 12, and the second machine-to-machine communication system 38 of the second machine 14, for working in collaboration with each other. As illustrated in the FIG. 1, the first machine-to-machine communication system 26 and the second machine-to-machine communication system 38 may be a system of components that enable the first machine 12 and the second machine 14 to communicate with each other, and with other machines of a fleet of machines (not shown). The first machine-to-machine communication system 26 and second machine-to-machine communication system 38, as illustrated diagrammatically in FIG. 1, may include those components of the communication system that enable the machines 10 to receive and send signals.

In an exemplary scenario, the first machine 12 is being assisted by the second machine 14 using a push operation. In order to assist the first machine 12, the second machine 14 is maneuvered to a position of engagement with the second push bar 22 (i.e., the rear push bar) of the first machine 12. Also, the first hook 20 of the first machine 12 is coupled to the second bail member 28 of the second machine 14. At the beginning of the push operation, uncontrolled impacts between the first machine 12 and the second machine 14 occur when the second push bar 22 of the first machine 12 is pushed by the first push bar 30 of the second machine 14. The uncontrolled impacts result in generation of impact energy, which may be captured by a regenerative coupling system, and stored in the first hydraulic accumulator 24 of the first machine 12. Further, during the collaboration between the first machine 12 and the second machine 14, when an external load on the first machine 12 is reduced at the end of a loading segment, a speed of the first machine 12 suddenly increases leading to yet another uncontrolled impact between the first machine 12 and the second machine 14. In such a scenario, a pull operation is performed by the first machine 12 such that the first machine 12, which completes the loading segment, pulls the second machine 14 while the second machine 14 is performing a loading segment. At the beginning of the pull operation, uncontrolled impacts are again generated between the first hook 20 of the first machine 12 and the second bail member 28 of the second machine 14. The uncontrolled impacts result in generation of impact energy, which may be captured by a regenerative coupling system, and stored in the second hydraulic accumulator 36 of the second machine 14. It should be noted that the first machine 12, and the second machine 14 are provided only for illustration purposes. The machines 10 may include more than two machines 10 collaborating with each other, without departing from the scope of the disclosure.

Figure 2:
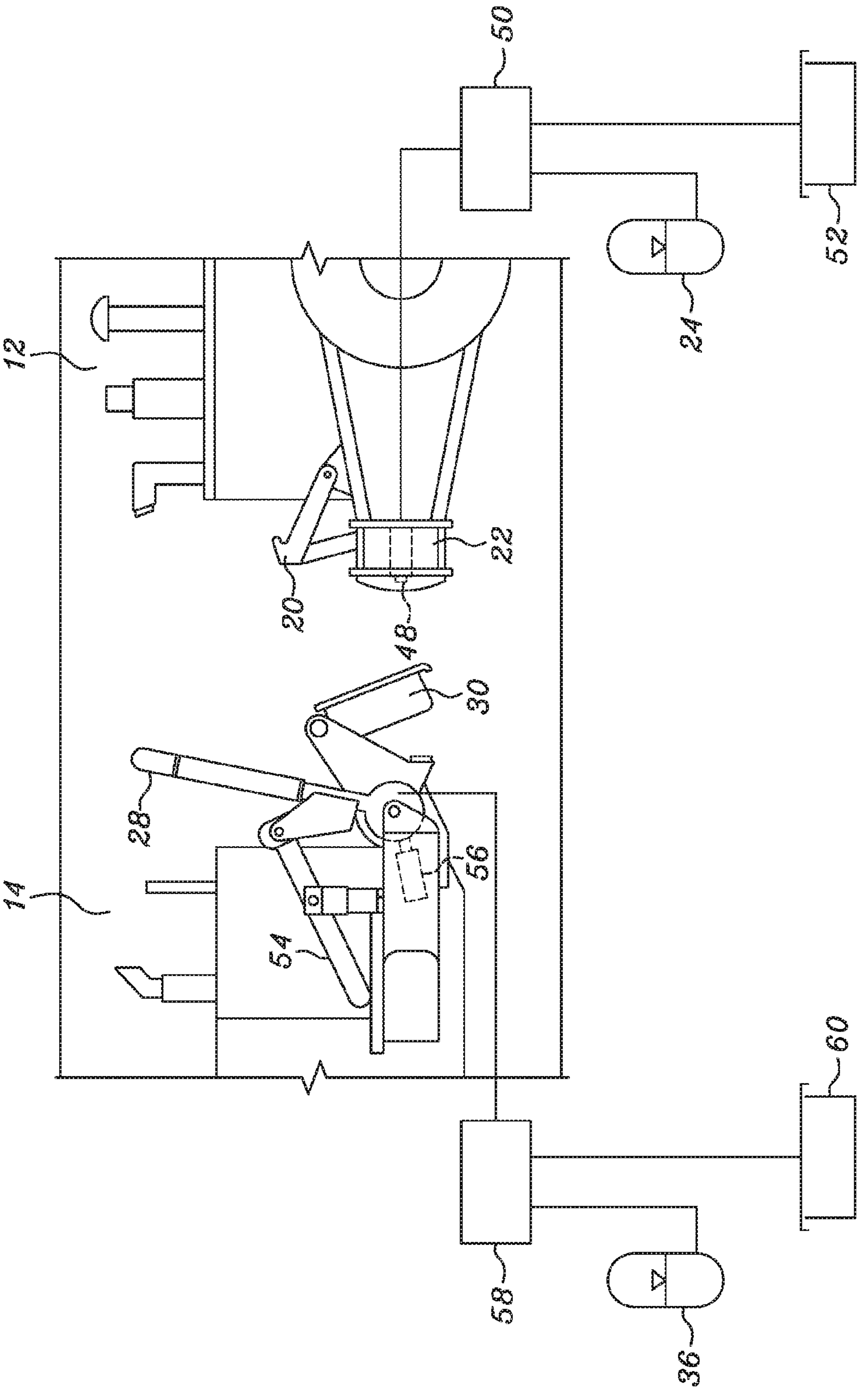
FIG. 2 is a schematic diagram illustrating the two machines configured to operate in at least one of a push operation and a pull operation, in accordance with the concepts of the present disclosure.

FIG. 2 is a schematic diagram illustrating the two machines 10 configured to operate in at least one of the push operation and the pull operation, in accordance with the concepts of the present disclosure. As shown in FIG. 2, the second push bar 22 of the first machine 12 includes a second hydraulic cylinder 48. The second hydraulic cylinder 48 is fluidly communicated to a first valve 50. The detailed fluid communication will be elaborated later in conjunction with FIG. 5.

On the other hand, a bail actuator 54 is operably connected to the second bail member 28 of the second machine 14, and configured to deploy the second bail member 28 of the second machine 14 to a position of engagement with the first hook 20 of the first machine 12, enabling the first machine 12 to pull the second machine 14. The second bail member 28 of the second machine 14 is connected to a third hydraulic cylinder 56. The third hydraulic cylinder 56 is fluidly communicated to a second valve 58. The detailed fluid communication will be elaborated later in conjunction with FIG. 5. It should be noted that the second hydraulic cylinder 48 and the third hydraulic cylinder 56 mentioned above, may be a single-acting hydraulic cylinder, or a double-acting hydraulic cylinder.

Referring to FIG. 1 and FIG. 2, the uncontrolled impacts are generated at the beginning of the push operation or the pull operation. The uncontrolled impacts result in generation of the impact energy between the first machine 12 and the second machine 14. In order to prevent the wastage of the impact energy generated at the beginning of the push operation, a controller (not shown) of the first machine 12 provides an instruction for actuating the first valve 50. Upon actuation, the first valve 50 establishes a fluid communication between the second hydraulic cylinder 48 and the first hydraulic accumulator 24 of the first machine 12. Thus, the impact energy is stored in the first hydraulic accumulator 24 of the first machine 12. Similarly, in order to prevent the wastage of the impact energy generated at the beginning of the pull operation, a controller (not shown) of the second machine 14 provides an instruction for actuating the second valve 58. Upon actuation, the second valve 58 establishes a fluid communication between the third hydraulic cylinder 56 and the second hydraulic accumulator 36 of the second machine 14. Thus, the impact energy is stored in the second hydraulic accumulator 36 of the second machine 14. The fluid communication is described later in conjunction with FIGS. 4 and 5.

It should be noted that the controller, may be a processor for effecting control of a regenerative machine coupling system. The controller may be embodied in a single housing or a plurality of housings distributed throughout a machine. Further, the controller may include power electronics, preprogrammed logic circuits, data processing circuits, volatile memory, non-volatile memory, software, firmware, combinations thereof, or any other controller structures known in the art.

The controller may also include a communication module configured to control communications between the first machine-to-machine communication system 26 of the first machine 12 and the second machine-to-machine communication system 38 of the second machine 14. The communication module may utilize either proactive routing protocols or location-oriented reactive routing protocols to forward data. The speeds and positions of the machines 10 during the collaboration are communicated and shared among the machines 10, and hence the relative speed and position, the beginning of the push operation and the beginning of the pull operation may be identified according to the data shared by the machines 10. In exemplary embodiments, the controller may be considered as a component of a machine-to-machine communication system.

Figure 3:
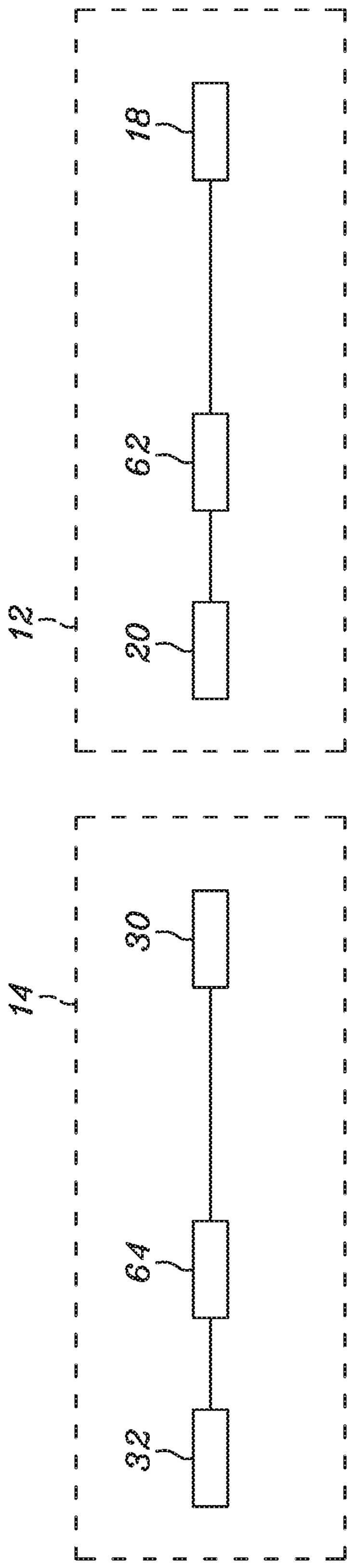
FIG. 3 is a block diagram illustrating components of the two machines collaborating with each other, in accordance with the concepts of the present disclosure.

FIG. 3 is a block diagram illustrating components of the two machines 10 collaborating with each other, in accordance with the concepts of the present disclosure. As shown in FIG. 3, the first hook 20 of the first machine 12 is fixed on a machine frame 62 of the first machine 12, and the first push bar 18 of the first machine 12 (i.e., the front push bar) is fixed on the machine frame 62 of the first machine 12. Similarly, the second hook 32 of the second machine 14 is fixed on a machine frame 64 of the second machine 14, and the first push bar 30 of the second machine 14 (i.e., the front push bar) is fixed on the machine frame 64 of the second machine 14.

Figure 4:
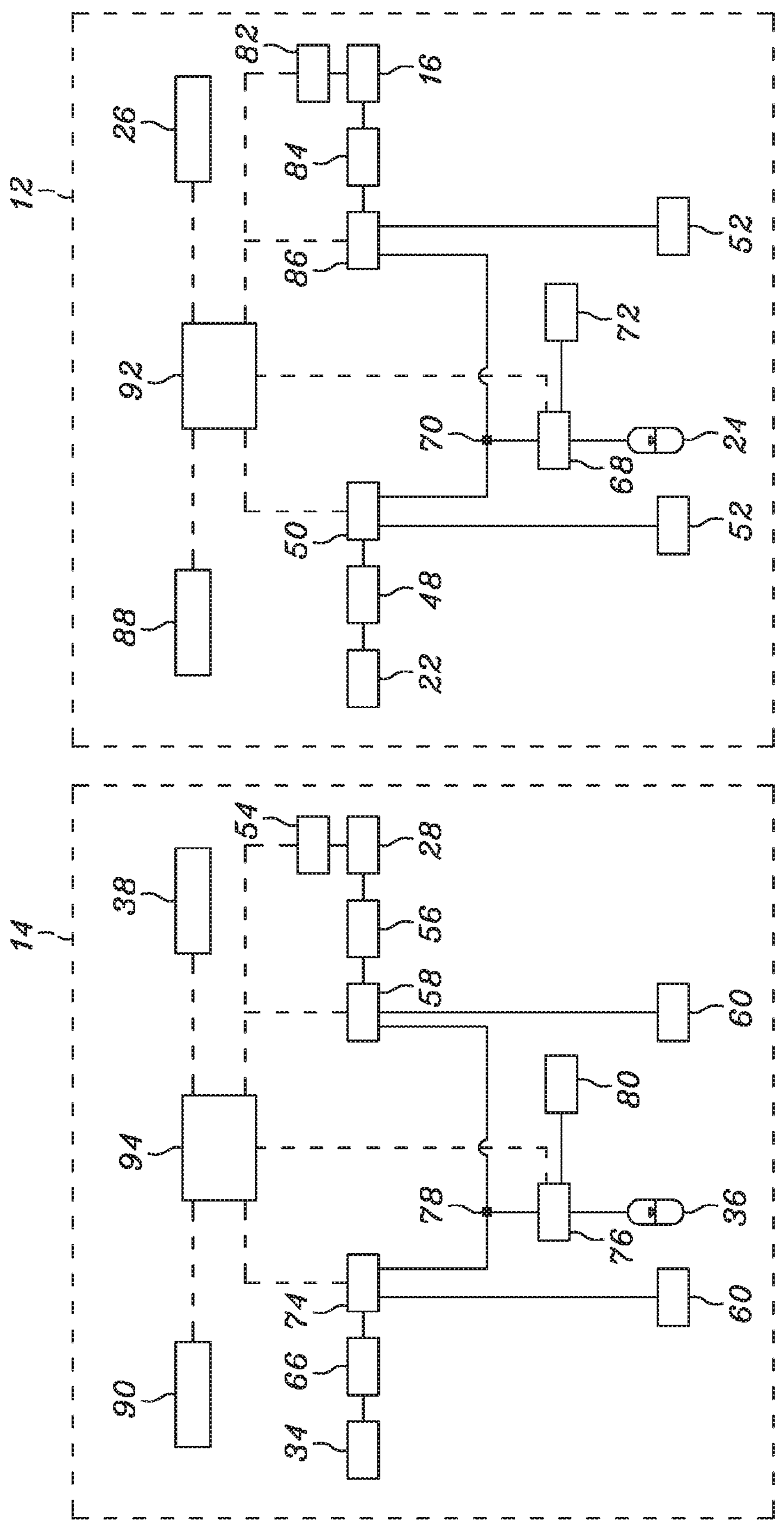
FIG. 4 is a block diagram illustrating the components of the two machines collaborating with each other in order to store impact energy generated during the at least one of the push operation and the pull operation, in accordance with the concepts of the present disclosure.

FIG. 4 is a block diagram illustrating the components of the two machines 10 collaborating with each other in order to store the impact energy generated during the push operation and the pull operation, in accordance with the concepts of the present disclosure. As shown in FIG. 4, the second push bar 22 (i.e., the rear push bar) of the first machine 12 and the second push bar 34 (i.e., the rear push bar) of the second machine 14 are connected to the second hydraulic cylinder 48 and a fourth hydraulic cylinder 66, respectively. As discussed above in FIG. 2, the second hydraulic cylinder 48 is fluidly communicated to the first valve 50. According to an aspect of the disclosure, the first valve 50 has a first configuration that effects fluid communication between the second hydraulic cylinder 48 and a third valve 68 of the first machine 12, and blocks fluid communication between the second hydraulic cylinder 48 and a first hydraulic fluid tank 52 of the first machine 12. According to another aspect of the disclosure, the first valve 50 has a second configuration that blocks the fluid communication between the second hydraulic cylinder 48 and the third valve 68 of the first machine 12, and effects fluid communication between the second hydraulic cylinder 48 and the first hydraulic fluid tank 52 of the first machine 12. According to another aspect of the disclosure, the first valve 50 has a third configuration that blocks the fluid communication between the second hydraulic cylinder 48 and the third valve 68 of the first machine 12, and blocks fluid communication between the second hydraulic cylinder 48 and the first hydraulic fluid tank 52.

According to an aspect of the disclosure, the third valve 68 of the first machine 12, has a first configuration that effects fluid communication between an inlet port 70 and the first hydraulic accumulator 24 of the first machine 12, and blocks fluid communication between the first hydraulic accumulator 24 and an implement hydraulic circuit 72. According to another aspect of the disclosure, the third valve 68 has a second configuration that blocks fluid communication between the inlet port 70 and the first hydraulic accumulator 24 of the first machine 12, and effects fluid communication between the first hydraulic accumulator 24 and the implement hydraulic circuit 72, and hence the captured energy can be utilized by the implement hydraulic circuit 72 of the first machine 12.

Similarly, the fourth hydraulic cylinder 66 of the second machine 14 is fluidly communicated to a first valve 74 of the second machine 14. According to an aspect of the disclosure, the first valve 74 of the second machine 14 has a first configuration that effects fluid communication between the fourth hydraulic cylinder 66 and a third valve 76 of the second machine 14, and blocks fluid communication between the fourth hydraulic cylinder 66 and a second hydraulic fluid tank 60 of the second machine 14. According to another aspect of the disclosure, the first valve 74 of the second machine 14 has a second configuration that blocks the fluid communication between the fourth hydraulic cylinder 66 and the third valve 76 of the second machine 14, and effects fluid communication between the fourth hydraulic cylinder 66 and the second hydraulic fluid tank 60. According to another aspect of the disclosure, the first valve 74 has a third configuration that blocks the fluid communication between the fourth hydraulic cylinder 66 and the third valve 76 of the second machine 14, and blocks fluid communication between the fourth hydraulic cylinder 66 and the second hydraulic fluid tank 60.

According to an aspect of the disclosure, the third valve 76 of the second machine 14, has a first configuration that effects fluid communication between an inlet port 78 and the second hydraulic accumulator 36 of the second machine 14, and blocks fluid communication between the second hydraulic accumulator 36 and an implement hydraulic circuit 80. According to another aspect of the disclosure, the third valve 76 has a second configuration that blocks fluid communication between the inlet port 78 and the second hydraulic accumulator 36 of the second machine 14, and effects fluid communication between the second hydraulic accumulator 36 and the implement hydraulic circuit 80, and hence the captured energy can be utilized by the implement hydraulic circuit 80 of the second machine 14.

Referring to FIG. 3 and FIG. 4, the bail actuator 54 of the second machine 14 is operably connected to the second bail member 28 of the second machine 14, and configured to deploy the second bail member 28 of the second machine 14 to a position of engagement with the first hook 20 of the first machine 12, enabling the first machine 12 to pull the second machine 14. The second bail member 28 of the second machine 14 is connected to the third hydraulic cylinder 56 of the second machine 14, which is fluidly communicated to the second valve 58 of the second machine 14. According to an aspect of the disclosure, the second valve 58 has a first configuration that effects fluid communication between the third hydraulic cylinder 56 and the third valve 76 of the second machine 14, and blocks fluid communication between the third hydraulic cylinder 56 and the second hydraulic fluid tank 60 of the second machine 14. According to another aspect of the disclosure, the second valve 58 has a second configuration that blocks the fluid communication between the third hydraulic cylinder 56 and the third valve 76 of the second machine 14, and effects fluid communication between the third hydraulic cylinder 56 and the second hydraulic fluid tank 60. According to another aspect of the disclosure, the second valve 58 has a third configuration that blocks the fluid communication between the third hydraulic cylinder 56 and the third valve 76 of the second machine 14, and blocks the fluid communication between the third hydraulic cylinder 56 and the second hydraulic fluid tank 60.

Similarly, a bail actuator 82 of the first machine 12 is operably connected to the first bail member 16 of the first machine 12. The first bail member 16 of the first machine 12 is connected to a first hydraulic cylinder 84 of the first machine 12. The first hydraulic cylinder 84 of the first machine 12 is fluidly communicated to a second valve 86 of the first machine 12. According to an aspect of the disclosure, the second valve 86 has a first configuration that effects fluid communication between the first hydraulic cylinder 84 and the third valve 68 of the first machine 12, and blocks the fluid communication between the first hydraulic cylinder 84 and the first hydraulic fluid tank 52 of the first machine 12. According to another aspect of the disclosure, the second valve 86 has a second configuration that blocks the fluid communication between the first hydraulic cylinder 84 and the third valve 68 of the first machine 12, and effects fluid communication between the first hydraulic cylinder 84 and the first hydraulic fluid tank 52 of the first machine 12. According to another aspect of the disclosure, the second valve 86 has a third configuration that blocks the fluid communication between the first hydraulic cylinder 84 and the third valve 68 of the first machine 12, and blocks the fluid communication between the first hydraulic cylinder 84 and the first hydraulic fluid tank 52.

Referring to FIG. 4, machine sensors 88 of the first machine 12 and machine sensors 90 of the second machine 14 are configured to provide speed and position information of the first machine 12 and the second machine 14, to a controller 92 of the first machine 12 and a controller 94 of the second machine 14 respectively. Thereafter, the controller 92 of the first machine 12 and the controller 94 of the second machine 14 are configured to define a start of the push operation and the pull operation. It should be noted that the fluid communication between the components is established using hydraulic lines and the electronic communication is established using communication lines. The hydraulic lines are shown as solid lines, and the communication lines are shown as dotted lines between the components of the machines 10.

Figure 5:
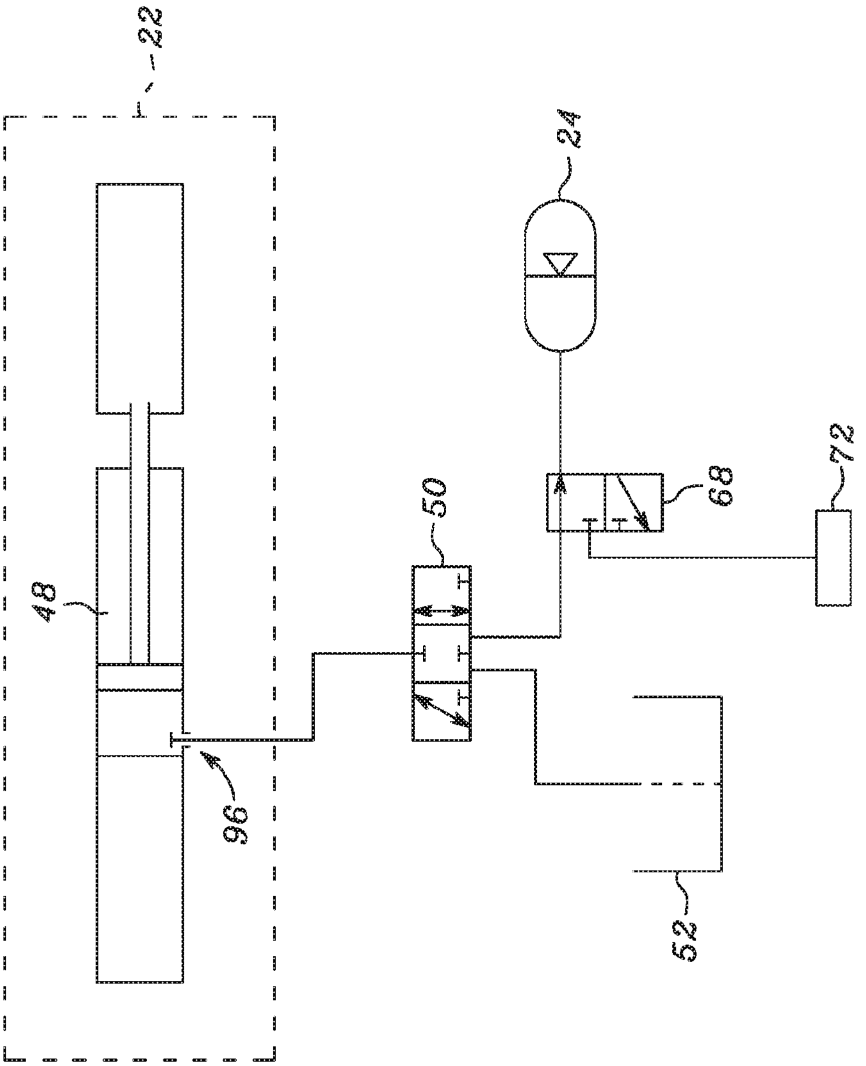
FIG. 5 is a block diagram illustrating a second push bar, having a second hydraulic cylinder, of a first machine, in accordance with the concepts of the present disclosure.

An embodiment of a hydraulic cylinder is illustrated in FIG. 5. Referring to FIG. 5, the second push bar 22 (i.e., the rear push bar) of the first machine 12 has the second hydraulic cylinder 48. The second hydraulic cylinder 48 having a cap port 96 (shown in FIG. 5) connected to a port of the first valve 50. Further, the third valve 68 of the first machine 12 is placed between the first valve 50 and the first hydraulic accumulator 24 of the first machine 12. A port of the third valve 68 is further connected to the implement hydraulic circuit 72 of the first machine 12. The first valve 50 is configured to effect different states of fluid communication between the first hydraulic accumulator 24, the first hydraulic fluid tank 52, and the cap port 96. As an example, the first valve 50 is a 3-way-3-position valve, and the third valve 68 is a 3-way-2-position valve. It should be noted that the above-mentioned embodiment of the hydraulic cylinder is applicable to other components of the machines 10 as well, such as the first bail member 16 of the first machine 12, the second push bar 34 of the second machine 14, and the second bail member 28 of the second machine 14, without departing from the scope of the disclosure.

At the beginning of the push operation, when the speed of the second machine 14 is greater than the speed of the first machine 12, the first push bar 30 of the second machine 14 impacts the second push bar 22 of the first machine 12 which results in generation of the impact energy. In order to prevent the wastage of the impact energy generated at the beginning of the push operation, the controller 92 of the first machine 12 provides an instruction for actuating the first valve 50 of the first machine 12. Upon actuation, the first valve 50 establishes the first configuration (described in conjunction with FIG. 4).

In the first configuration, the first valve 50 establish a fluid communication between the second hydraulic cylinder 48 and the third valve 68 of the first machine 12, via the cap port 96, and blocks the fluid communication between the second hydraulic cylinder 48 and the first hydraulic fluid tank 52 of the first machine 12. Further, the third valve 68 of the first machine 12 selects the first configuration to establish the fluid communication between the inlet port 70 and the first hydraulic accumulator 24 of the first machine 12, and blocks the fluid communication between the first hydraulic accumulator 24 and the implement hydraulic circuit 72. Thus, the impact energy generated at the beginning of the push operation is stored in the first hydraulic accumulator 24 of the first machine 12. Thereafter, the stored impact energy is reused by the implement hydraulic circuit 72 when the third valve 68 of the first machine 12, which is placed between the first valve 50 and the first hydraulic accumulator 24 of the first machine 12, selects the second configuration (described in conjunction with FIG. 4) to block the fluid communication between the inlet port 70 and the first hydraulic accumulator 24 of the first machine 12, and effects the fluid communication between the first hydraulic accumulator 24 and the implement hydraulic circuit 72, and hence the captured energy can be utilized by the implement hydraulic circuit 72 of the first machine 12.

Eventually, when a relative speed of the first machine 12 and the second machine 14 is zero, then the controller 92 of the first machine 12 provides an instruction for actuating the first valve 50. Upon actuation, the first valve 50 establishes the third configuration (described in conjunction with FIG. 4). In the third configuration, the first valve 50 blocks the fluid communication between the second hydraulic cylinder 48 and the first hydraulic fluid tank 52, in order to transfer the energy between the first machine 12 and the second machine 14 effectively for the push operation.

In addition to the first configuration and the third configuration, the first valve 50 is configured to establish the second configuration (described in conjunction with FIG. 4) in which the fluid communication between the second hydraulic cylinder 48 and the first hydraulic fluid tank 52 of the first machine 12 is established, via the cap port 96. In the second configuration, oil is replenished to the second hydraulic cylinder 48 after the collaboration between the first machine 12 and the second machine 14 is completed and a coupling is disengaged. The oil is replenished due to a bias forces exerted by a bias member such as a spring (not shown). The mechanism of the bias member is well known in the art.

At the beginning of the pull operation, when a speed of the first machine 12 is greater than a speed of the second machine 14, the first hook 20 of the first machine 12 impacts the second bail member 28 of the second machine 14, which results in generation of the impact energy. In order to prevent the wastage of the impact energy generated at the beginning of the pull operation, the controller 94 of the second machine 14 provides an instruction for actuating the second valve 58. The second valve 58 establishes a fluid communication between the third hydraulic cylinder 56 and the second hydraulic accumulator 36 in a similar manner as discussed above when the second valve 58 and the third valve 76 of the second machine 14 are in the first configuration (described in conjunction with FIG. 4). Then, the impact energy generated at the beginning of the pull operation is stored by the second hydraulic accumulator 36 in the second machine 14. Thereafter, the impact energy stored in the second hydraulic accumulator 36 of the second machine 14 is reused by the implement hydraulic circuit 80 of the second machine 14.

It will be apparent to one skilled in the art that the above-mentioned system for recovering the impact energy generated during the at least one of the push operation and the pull operation may be applicable in a single machine as well, without departing from the scope of the disclosure.

INDUSTRIAL APPLICABILITY

Earth moving machines are utilized for a variety of tasks such as for excavating, scraping, hauling, pushing material, and dumping excavated material and are affected by working conditions of a work site. In order to increase the productivity and/or the efficiency of the tasks, typically, another machine is used in collaboration with a first machine. In order to fulfill the collaboration between two machines or among multiple machines, the coupling assembly (e.g. hitch, hook, bail or pushing pad) are installed on the earth moving machines. However, the contact between two machines, during collaboration, is difficult to control. The uncontrolled contact increases fatigue in machine components and decreases useful life of machines. Moreover, the unpredictable load condition during a loading process can also result in sudden uncontrolled contact between the machines working in collaboration. Also, the impact energy, arising out of uncontrolled contacts, is wasted and results in fatigue of the machine components, and decreases the useful life of machines.

Figure 6:
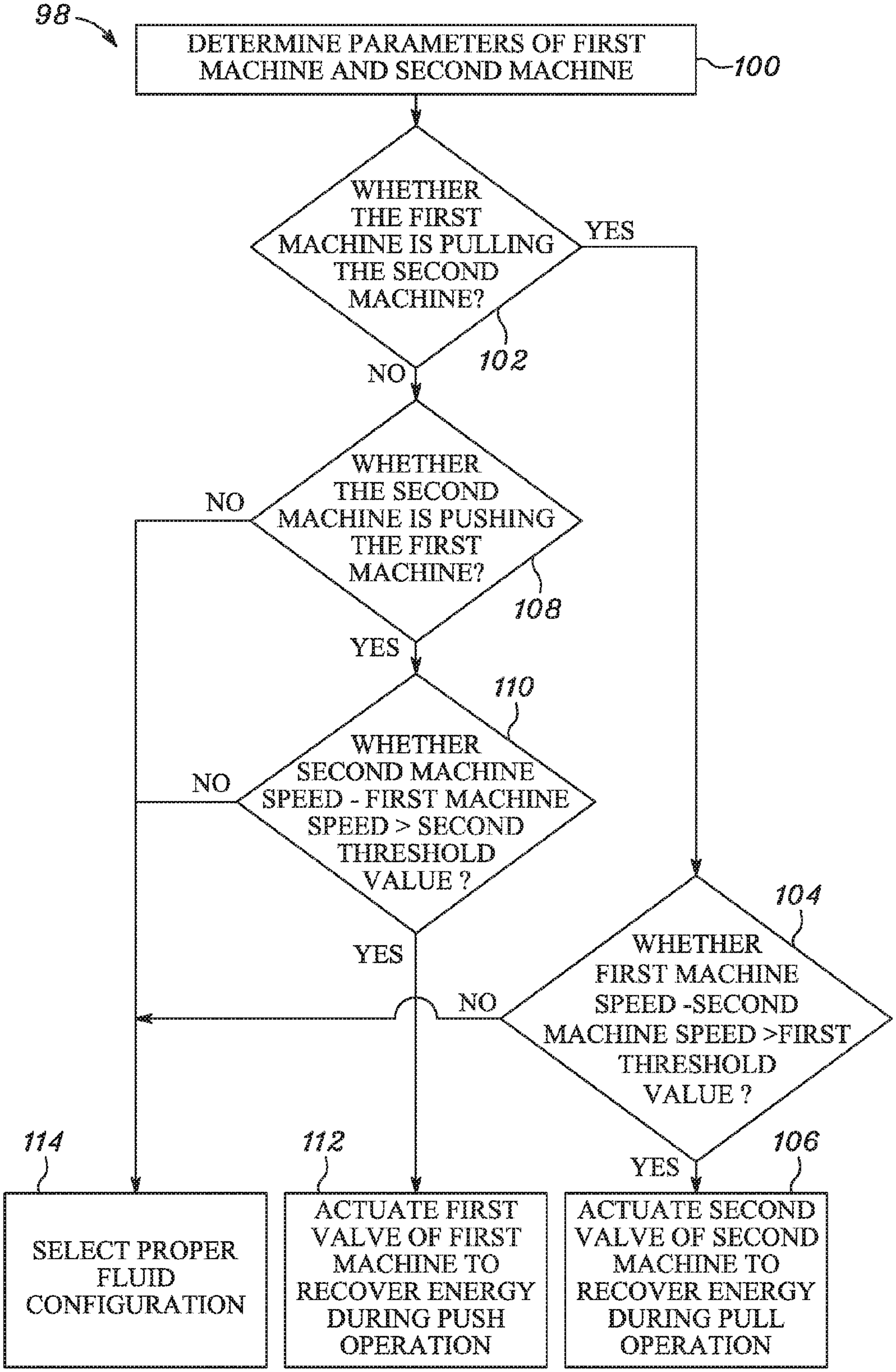
FIG. 6 is a flowchart illustrating a method for recovering the impact energy generated during the at least one of the push operation and the pull operation between the two machines, in accordance with the concepts of the present disclosure.

FIG. 6 is a flowchart illustrating a method 98 for recovering the impact energy generated during the at least one of the push operation and the pull operation between the two machines 10, in accordance with the concepts of the present disclosure. The method 98 is described in conjunction with FIGS. 1, 2, 3, 4, and 5.

At step 100, parameters of the first machine 12 and the second machine 14 are determined by the controller 92 (shown in FIG. 4) of the first machine 12 and the controller 94 (shown in FIG. 4) of the second machine 14 respectively. The controller 92 of the first machine 12 and the controller 94 of the second machine 14, receive the speed and the position information from the machine sensors 88 and the machine sensors 90 respectively. The parameters of the first machine 12 and the second machine 14 are utilized to recover the impact energy generated at the beginning of the push operation and the pull operation. In an embodiment, the parameters such as, but not limited to, a speed, a weight, a location, or a position of the first machine 12 and the second machine 14. It should be noted that the above-mentioned parameters have been provided only for illustration purposes, other parameters of the first machine 12 and the second machine 14 may be determined, without departing from the scope of the disclosure.

At step 102, it is checked whether the first machine 12 is pulling the second machine 14. If the first machine 12 is pulling the second machine 14 (answer is "Yes"), the method 98 goes to the step 104. Otherwise, the method 98 goes to the step 108.

At step 104, the controllers compare the difference between the speed of the first machine 12 and the speed of the second machine 14 to a first threshold value, which is predetermined during calibration tests. If the difference between the speed of the first machine 12 and the speed of the second machine 14 is greater than the first threshold value (answer is "Yes"), the method 98 goes to the step 106. Otherwise, the method 98 goes to the step 114.

At step 106, the controller 94 of the second machine 14 provides an instruction for actuating the second valve 58 and the third valve 76 of the second machine 14 to establish the fluid communication between the third hydraulic cylinder 56 and the second hydraulic accumulator 36 of the second machine 14. Thereafter, the impact energy is stored in the second hydraulic accumulator 36 of the second machine 14.

At step 114, a proper fluid configuration (the third configuration of the first valve 50 of the first machine 12 and the second valve 58 of the second machine 14) is selected by the controller 92 of the first machine 12, and/or the controller 94 of the second machine 14, for deactivating an energy recovery function.

Referring again to step 108, whether the second machine 14 is pushing the first machine 12 is checked. If the second machine 14 is pushing the first machine 12 (the answer is "yes"), the method 98 goes to the step 110. Otherwise, the method 98 goes to the step 114.

At step 110, the controllers compare the difference between the speed of the second machine 14 and the speed of the first machine 12 to a second threshold, which is predetermined during calibration tests. If the difference between the speed of the second machine 14 and the speed of the first machine 12 is greater than the second threshold value (the answer is "Yes"), the method 98 goes to the step 112. Otherwise, the method 98 goes to the step 114.

At step 112, the controller 92 of the first machine 12 provides an instruction for actuating the first valve 50 and the third valve 68 of the first machine 12 to establish the fluid communication between the second hydraulic cylinder 48 and the first hydraulic accumulator 24 of the first machine 12, as discussed above. Thereafter, the impact energy is stored in the first hydraulic accumulator 24 of the first machine 12.

The present disclosure provides the system for recovering the impact energy during the push operation and the pull operation between the two machines 10 operated in the worksite. The system discloses the first machine 12 and the second machine 14 having the controller 92 and the controller 94 respectively, that provide an instruction to selectively actuate the first valve 50 and the second valve 58 in order to store the impact energy generated due to the uncontrolled impacts generated at the beginning of the push operation and the pull operation. Upon actuation, the first valve 50 establishes the fluid communication between the second hydraulic cylinder 48 and the first hydraulic accumulator 24 during the push operation. Similarly, the second valve 58 establishes the fluid communication between the third hydraulic cylinder 56 and the second hydraulic accumulator 36 during the pull operation. Consequently, the impact energy generated due to uncontrolled impacts at the beginning of the push operation and the pull operation is stored in the first hydraulic accumulator 24 of the first machine 12 and the second hydraulic accumulator 36 of the second machine 14, respectively. Thereafter, the stored impact energy is reused by the implement hydraulic circuit 72 of the first machine 12 and the implement hydraulic circuit 80 of the second machine 14. Therefore, the system of the present disclosure allows the recovery of the impact energy generated during the collaboration of the two or more machines, and also increases the useful life of the machines 10 and components.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for recovering impact energy generated during at least one of a push operation and a pull operation between two or more machines operated in a worksite, the system comprising:

a first machine having:

a first bail member and a first push bar at a first end of the first machine, wherein the first bail member includes a first hydraulic cylinder; and a first hook and a second push bar at a second end of the first machine, wherein the second push bar includes a second hydraulic cylinder, the second hydraulic cylinder being in fluid communication with a first hydraulic accumulator; and a second machine having:

a second bail member and a first push bar at a first end of the second machine, wherein the second bail member includes a third hydraulic cylinder, the third hydraulic cylinder being in fluid communication with a second hydraulic accumulator; and a second hook and a second push bar at a second end of the second machine, wherein the second push bar includes a fourth hydraulic cylinder;

wherein the first machine and the second machine are adapted to work in collaboration, such that the first hook of the first machine coupled to the second bail member of the second machine, and the second push bar of the first machine being in mechanical contact with the first push bar of the second machine;

wherein the impact energy generated at a beginning of the push operation by the second machine may be captured by a regenerative coupling system, and stored in the first hydraulic accumulator;

wherein the impact energy generated at a beginning of the pull operation by the first machine may be captured by a regenerative coupling system, and stored in the second hydraulic accumulator.

* * * * *